US012102143B2

(12) United States Patent
Harris

(10) Patent No.: US 12,102,143 B2
(45) Date of Patent: Oct. 1, 2024

(54) COMBINATION VIBRATIONAL AND THERMAL JUMPER

(71) Applicant: Alisha G. Harris, Malvern, AR (US)

(72) Inventor: Alisha G. Harris, Malvern, AR (US)

( * ) Notice: Subject to any disclaimer, the term of this patent is extended or adjusted under 35 U.S.C. 154(b) by 981 days.

(21) Appl. No.: 16/992,532

(22) Filed: Aug. 13, 2020

(65) Prior Publication Data

US 2020/0375277 A1 Dec. 3, 2020

Related U.S. Application Data

(63) Continuation-in-part of application No. 16/130,623, filed on Sep. 13, 2018, now abandoned.

(51) Int. Cl.

| | |
|---|---|
| ***A41D 1/00*** | (2018.01) |
| ***A41D 13/005*** | (2006.01) |
| ***A41D 13/05*** | (2006.01) |
| ***A41D 27/00*** | (2006.01) |
| ***A41D 31/00*** | (2019.01) |
| ***H05B 3/34*** | (2006.01) |

(52) U.S. Cl.
CPC ......... *A41D 13/0051* (2013.01); *A41D 1/005* (2013.01); *A41D 13/05* (2013.01); *H05B 2203/036* (2013.01)

(58) Field of Classification Search
None
See application file for complete search history.

(56) References Cited

U.S. PATENT DOCUMENTS

| | | | | |
|---|---|---|---|---|
| 3,751,620 A * | 8/1973 | Yuasa | H05B 3/342 | 338/211 |
| 4,539,700 A * | 9/1985 | Sato | H04R 5/023 | 455/343.1 |
| 5,907,294 A * | 5/1999 | Welte | B61L 23/06 | 340/901 |
| 10,004,283 B1 * | 6/2018 | Baude | A41D 13/0051 | |
| 10,035,572 B1 * | 7/2018 | Armendariz | B63C 9/155 | |
| 2008/0040831 A1 * | 2/2008 | Nilforushan | A61F 7/02 | 219/211 |

(Continued)

FOREIGN PATENT DOCUMENTS

| | | |
|---|---|---|
| CN | 104664726 A * | 6/2015 |
| CN | 105852254 A * | 8/2016 |

(Continued)

OTHER PUBLICATIONS

CN-104664726-A, Jun. 2015, Zhu, partial translation (Year: 2015).*
CN-104664726-A, Jun. 2015, Zhu, Biblio—data page. (Year: 2015).*

*Primary Examiner* — Janie M Loeppke
*Assistant Examiner* — Theodore J Evangelista
(74) *Attorney, Agent, or Firm* — Stonebridge IP, PLLC

(57) ABSTRACT

The disclosed inventive concept comprises a form-fitting body suit, or thermal jumper for wearing by a person, the jumper further comprising an internalized plurality of separate but integral pads. Each of the pads is secured within a pocket attached to the interior surface of the jumper, the pockets corresponding to the location of specific parts of the human anatomy when the jumper is donned by a wearer. Each pad functions as 1) a conductor of varying ranges of heat and 2) a source of vibration when integral wiring in the pad is activated by electrical current generated by at least one battery or rechargeable battery pack.

23 Claims, 9 Drawing Sheets

(56) References Cited

U.S. PATENT DOCUMENTS

| | | | | |
|---|---|---|---|---|
| 2008/0201818 | A1* | 8/2008 | Nilforushan | A61F 7/02 607/114 |
| 2009/0230112 | A1* | 9/2009 | Ducharme | A61F 7/007 2/102 |
| 2013/0111579 | A1* | 5/2013 | Newman | G06F 1/1694 726/17 |
| 2014/0246416 | A1* | 9/2014 | White | A41D 13/01 219/211 |
| 2014/0353300 | A1* | 12/2014 | Swiatek | H05B 1/0272 219/211 |
| 2015/0060430 | A1* | 3/2015 | Tsuge | H05B 3/145 219/211 |
| 2015/0273178 | A1* | 10/2015 | Johnson | A61M 21/02 600/27 |
| 2015/0382402 | A1* | 12/2015 | Chen | H05B 1/0272 219/211 |
| 2016/0050716 | A1* | 2/2016 | Peng | A41D 13/0051 219/494 |
| 2016/0198776 | A1* | 7/2016 | Stevens | A41D 13/0058 219/211 |
| 2017/0055055 | A1* | 2/2017 | Albanese | H04H 20/86 |
| 2017/0229692 | A1* | 8/2017 | Thiel | H02S 30/20 |
| 2017/0280233 | A1* | 9/2017 | Dominijanni | H04R 1/025 |
| 2018/0102656 | A1* | 4/2018 | Thiel | A45C 13/36 |
| 2018/0243549 | A1* | 8/2018 | Hill | A41C 3/0007 |

FOREIGN PATENT DOCUMENTS

| | | | | | |
|---|---|---|---|---|---|
| CN | 205456174 | U | * | 8/2016 | |
| CN | 108308750 | A | * | 7/2018 | A41D 13/0051 |
| CN | 111904050 | A | * | 11/2020 | |
| ES | 1300405 | U | * | 9/2023 | |
| FR | 2979805 | A1 | * | 3/2013 | A41D 13/0051 |
| GB | 2612057 | A | * | 4/2023 | B32B 15/095 |

* cited by examiner

COMBINATION VIBRATIONAL AND THERMAL JUMPER

CROSS-REFERENCES TO RELATED APPLICATIONS

This application is a continuation-in-part patent application of U.S. application Ser. No. 16/130,623 filed on Sep. 13, 2018, the entire contents of which are hereby incorporated by reference.

BACKGROUND OF THE INVENTION

(1) Field of the Invention

This inventive concept relates to thermal heating pad products and, more particularly, to a wearable thermal heat padded suit for providing users with a way to soothe joint and muscle pain throughout the body and further, promote healing of injuries to the body. Prior versions of thermal garments have been normally provided with internal heating elements. An electrical current directed to the heating element will cause the same to heat the garment and the body around which the garment is disposed.

This is particularly important in these times of high energy costs because thermal garments can be worn within a dwelling during winter and the dwelling thermostat can be set at a minimum while the occupants within are warm and comfortable. Thermal garments are a very efficient way of maintaining heating comfort for individuals because a very minimum area is being heated and the occurrences of heat loss are greatly minimized.

(2) Description of the Related Art, Including Information Disclosed Under 37 CFR 1.97 and 1.98

U.S. Pat. No. 3,028,857; Parker, M. E.; Jan. 30, 1961. This invention relates generally to clothing, and more particularly, to a new and improved set of clothing for exercising having self-massaging means incorporated therein. The disclosed body-suit garment provides gentle massaging of the entire body while exercise is taking place. The interior surface of the garment is composed of knit or rubberized material having vulcanized on the surface a series of close-spaced rubber or other soft massaging tips.

U.S. Pat. No. 5,938,628; Oguri, et al; Aug. 17, 1999. Disclosed is a suit-type cosmetic air massage device for providing air pressuring massage upon a human whole body. To provide air pressuring massage, suit-shaped parts are made to cover a human whole body, and can be separated into an upper suit-shaped part and a lower suit-shaped part. And plural air bags are symmetrically installed within the left and right side from the position corresponding to the hand region to the position corresponding to the shoulder regions of the upper suit-shaped part, and from the position corresponding to the feet parts to the waist part of the lower suit-shaped part. These air bags are divided into the first, second, third and fourth group, and each air bag in each group can be supplied with air simultaneously or independently in order from connecting with the intake/exhaust instrument by an intaking/exhausting hose.

U.S. Pat. No. 4,384,369; Prince, L; May 24, 1983. An exercise suit includes a jacket and pants having numerous pockets. The pockets carry bags containing liquid to provide a weight load and massaging muscle stimulation during body movement. The pockets are so distributed about the user's body as to provide dynamic contact with externally exposed muscles. The bags are configured to be received within corresponding pockets of the suit and are formed of vinyl panels with dielectrically welded seams. A closure is provided to permit the user to fill each bag with a desired quantity of liquid, and the outer panel of each bag includes an insulating foam layer. To permit automatic adjustment for different body sizes, the sleeves and legs of the suit are longitudinally slit and an elastic strap draws the opposite edges of each slit toward one another thus maintaining the suit and its dynamic load in proximate contact with the user's limbs.

U.S. Pat. No. 3,521,621; Smith, M. G.; Jul. 28, 1970. The invention is a suit for circulation of fluid around the body for use in conjunction with a physical therapy apparatus is provided having a pliable enclosure means which maintains the circulating fluid therein. A fluid-tight fastening means is positioned around the body; Connecting means are mounted on the exterior of the enclosure means so that the enclosure means and thus various parts of the body can be secured to the physical therapy apparatus so that the body can be exercised while fluid is circulating through the enclosure means and thus around the body.

U.S. Pat. No. 4,732,140; Stoffregen, R. Mar. 22, 1988. A vibratory massage device for use in conjunction with therapeutic exercises. The device has several belts of varying sizes, to which one or two vibrator units can be releasably attached for use on various body parts. An elastic band on each belt firmly presses the vibratory unit against the belt web when the belt is tightened, so as to prevent irritation-producing movement between the belt and the patient's skin. The motor of the vibratory unit is provided with a carrier bearing and eccentric-operated air flow means to permit miniaturization of the vibratory unit without loss of effectiveness.

BRIEF SUMMARY OF THE INVENTION

The disclosed inventive concept comprises a form-fitting body suit, or thermal jumper 1 for wearing by a person, the jumper 1 further comprising an internalized plurality of separate but integral padded elements (items 20-53 and 60-63). Each of the padded elements (collectively, item 9) is securely attached to the interior surface of the jumper 1 so as to correspond to the location of a specific part of the human anatomy when the jumper 1 is donned by a wearer. Reference is made to FIG. 1 and FIG. 2.

Each padded element 9 functions as 1) a conductor of varying ranges of heat and 2) a source of gentle vibrating action when the padded element 9 is activated by electrical current generated by a wrist-worn controller 2 through dc-powered sources. In order to make the disclosed thermal jumper 1 practical and useful, it is necessary to utilize dc battery power so that the jumper 1 can be worn without the restrictions and bulkiness of an AC power supply system.

The bulkiness and weight factor alone has given rise to many drawbacks and disadvantages and has generally discouraged the wide use and acceptance of such thermal garments. First, an appropriate battery package may be heavy and cumbersome. This functional issue is important since the wearer of the jumper 1 must transport the electrical supply assembly wherever the jumper 1 is taken. Secondly, a battery package can be expensive and often the life of the associated batteries is relatively short. Finally, those batteries that are rechargeable may require a relatively long period for recharging.

The use of thermal garments for outdoor use, either while participating in recreation or at work has been substantial but unsupported to a large extent by a suitable electrical power accessory. Accordingly, a need remains for a wearable apparatus in order to overcome the previously-described shortcomings.

The present inventive concept satisfies such a need by providing a thermal jumper 1 that is convenient and easy to use. The body suit/jumper 1 is lightweight yet durable in design, versatile in its applications, and constructed to provide a user with a method of soothing joint and muscle pain throughout the body.

| Index to Nomenclature of Invention Components | |
|---|---|
| 1. | Jumper (body suit) |
| 2. | Controller |
| 3. | Wiring |
| 4. | Pad pocket |
| 5. | Slide pocket |
| 6. | Skin |
| 7. | Inner material |
| 8. | Outer material |
| 9. | Pad |
| 10. | Zipper |
| 11. | Window temp display |
| 12. | Window massage level display |
| 13. | Front padding elements |
| 14. | Rear padding element |
| 15. | Temperature increase |
| 16. | Temperature decrease |
| 17. | Vibration level increase |
| 18. | Vibration level decrease |
| 19. | Seam |
| 20. | Left foot instep |
| 21. | Right foot instep |
| 22. | Left ankle |
| 23. | Right ankle |
| 24. | Left rear calf |
| 25. | Right rear calf |
| 26. | Left kneecap |
| 27. | Right kneecap |
| 28. | Left inner knee |
| 29. | Right inner knee |
| 30. | Left inner thigh |
| 31. | Right inner thigh |
| 32. | Left outer thigh |
| 33. | Right outer thigh |
| 34. | Left gluteous |
| 35. | Right gluteous |
| 36. | Lower spine |
| 37. | Mid-spine |
| 38. | Upper spine |
| 39. | Lower left back |
| 40. | Left top shoulder |
| 41. | Right top shoulder |
| 42. | Left shoulder blade |
| 43. | Right shoulder blade |
| 44. | Left front shoulder |
| 45. | Right front shoulder |
| 46. | Left elbow |
| 47. | Right elbow |
| 48. | Left arm fold |
| 49. | Right arm fold |
| 50. | Left bicep |
| 51. | Right bicep |
| 52. | Left wrist |
| 53. | Right wrist |
| 54. | Lower right back |
| 55. | Heating element |
| 56. | Core/vibration generator |
| 57. | Left back thigh |
| 58. | Right back thigh |
| 60. | Left lung |
| 61. | Right lung |
| 62. | Left breast |
| 63. | Right breast |
| 64. | Right neck |

-continued

| Index to Nomenclature of Invention Components | |
|---|---|
| 65. | Left neck |
| 66. | n/a |
| 67. | Right abdomen |
| 68. | Left abdomen |
| 69. | n/a |
| 70. | On-Off switch |
| 71. | Upper/Lower control |
| 72. | Full Jumper control |

BRIEF DESCRIPTION OF THE VIEWS OF THE DRAWINGS AS EXEMPLARY EMBODIMENTS OF THE INVENTIVE CONCEPT

FIG. 1 is a frontal view of a stylized version of the thermal jumper 1 showing predominately the frontal padding elements 13 system including pads of the shoulders 40, 41, biceps 50, 51, lungs 60, 61, inner elbows 48, 49, lower abdomen 68, inner thighs 30, 31, kneecaps 26, 27, ankles 22, 23, and foot insteps 20, 21. Also shown is the wrist-mounted controller 2. The frontal padding elements 13 shown typify the preferred embodiment of the thermal jumper 1. Other embodiments may contain more or fewer of the padding elements 13. Further, the relative size of the frontal padding elements 13 as shown, are for illustrative purposes only, and do not serve to limit or restrict their size or location.

FIG. 2 is a rear view of a stylized version of the thermal jumper 1 which predominantly shows the rear padding elements 14 system, including neck 64, 65, shoulder tops 40, 41, shoulder blades 42, 43, spinal areas 36, 37, 38, elbows 46, 47, wrists 52, 53, gluteous 34, 35, inner knees 28, 29, lower back 39, 54, back thigh 57, 58, and calves 24, 25. The rear padding elements 14 shown typify the preferred embodiment of the thermal jumper 1. Other embodiments may contain more or fewer of the padding elements 14. Further, the relative size of the rear padding elements 14 as shown, are for illustrative purposes only, and do not serve to limit or restrict their size or location.

FIG. 3 illustrates a stylized version of the typical pad 9 heating and vibrational element used in the thermal jumper 1, further showing wiring 3 that may conduct electrical current to the individual pad 9.

DETAILED DESCRIPTION OF THE INVENTION

Figure 1:
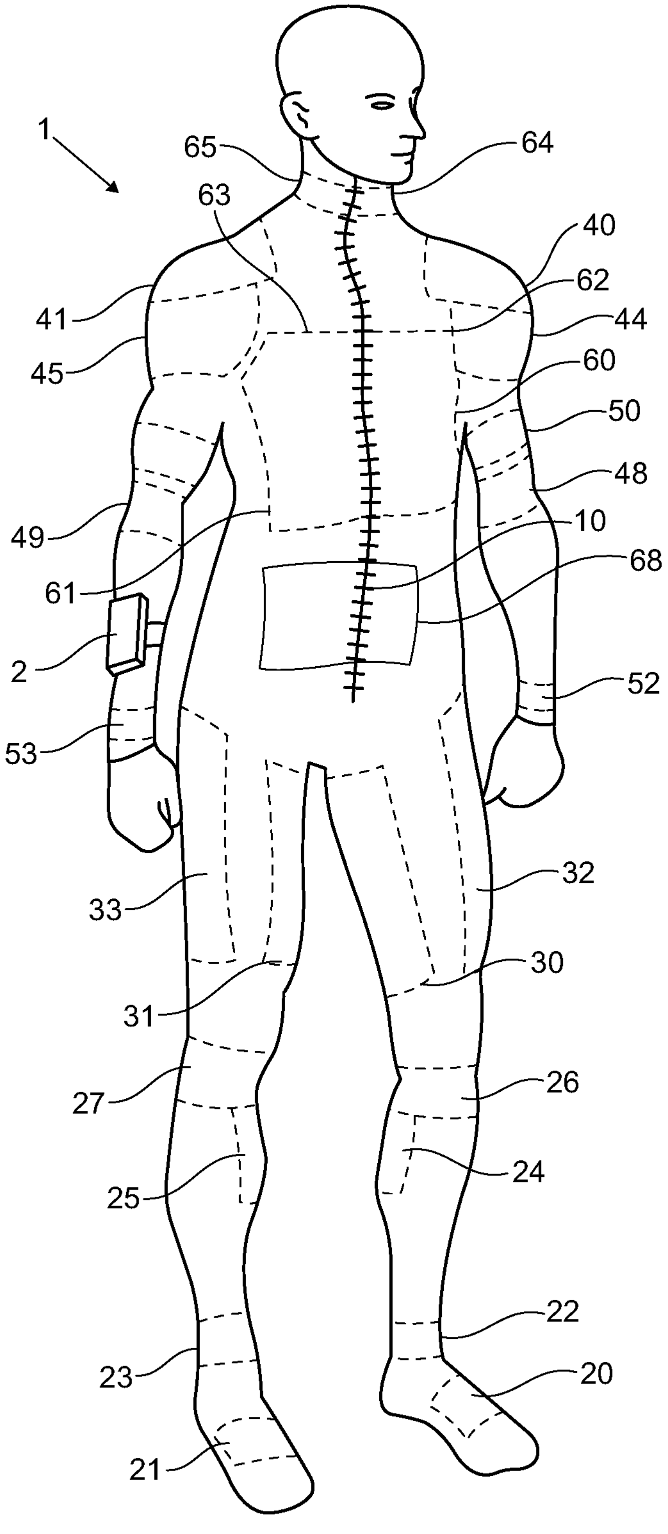

The objects, features, and advantages of the inventive concept presented in this application are more readily understood when referring to the accompanying drawings. The drawings, totaling six figures, show the basic components and functions of the preferred embodiment. In the several figures, like reference numbers are used in each figure to correspond to the same component as may be depicted in other figures.

The disclosed inventive concept comprises a form-fitting body suit 1, referred to as a thermal “jumper” 1. The thermal jumper 1 is for wearing by a person who seeks the soothing application of warm temperatures to a variety of locations on the anatomy, particularly aching joints or areas of muscular distress due to injury. These temperatures are generated by a plurality of frontal pack systems 13 comprising heat padding elements 9 and a plurality of rear pack systems 14 of the same type heating padding elements 9. A separate, continuous wiring system 3 not only conveys electrical current for heating each of the pads 9, but also provides electrical current to induce minute vibrations emitting from either or both the frontal pack 13 or the rear pack 14 systems, whichever of these the wearer selects.

Referring to the drawing figures in general, the thermal jumper 1 preferably includes heating pads 20-68 located on every major muscle and joint in the body, a controller 2 with separate switches for adjusting the heat intensity, as well as setting the desired level of vibration in the pads 9, that is, the controller 2 can control all the pads individually or perform a group control, and the On-Off switch is located on the side of the controller. The controller 2 on the right wrist must be placed a couple of inches behind the right wrist heating pad 53 to avoid wrist heat pad 53 & electrical controller 2 causing heat conflictions. The components must be powered by a detachable D-cell rechargeable battery which located within a small right-side pocket on the body suit 1. The thermal jumper 1 may be manufactured from materials common to the heating pad industry with all the consumer safety matters taken into consideration.

In some embodiments, the controller 2 is located on the wrist, and controls the different changes of heated pad temperature degree levels & the different changes of vibrational levels of (soft or hard) force of pressure to each pad.

The heat and vibrational therapy provided by the thermal jumper 1 are effective in relieving tightness of various muscle groups and recovering from muscular injuries. Blood circulation is improved due to the moderate heat application dilating the blood vessels in those areas in contact with the pads 9. Blood circulates more readily throughout the muscles, the spinal column, and bodily organs. The functioning of the lungs improves while wearing the thermal jumper 1, as oxygen flow is improved. Slight perspiration, which may be generated by use of the thermal jumper 1, helps the body rid itself of toxins through the pores of the skin. The heat applied by the pads 9 of the thermal jumper 1 promotes the body’s level of cortisol, the body’s primary stress hormone, thereby allowing a wearer to relax and de-stress.

The thermal jumper 1 is formed from elastomeric material and is suitably sized and shaped for being tightly fitted along the skin 6 surface area of a human body. The jumper 1 accessories include a rechargeable power source, a controller 2 electrically coupled thereto and a plurality of sensors in communication with the controller 2. The sensors regularly detect the real time temperature of various body regions and cooperate with a plurality of heat emitting pads 20-68 for improving blood circulation throughout the user’s blood vessels.

The pads 9 of the front and rear pack systems 13, 14 are secured within pad pockets 4 fabricated between a first inner material 7 and a second outer material 8, both of these materials being conjoined at a seam 19 about the perimeter of each pad pocket 4. The heating pads 20-68, as stated previously, are secured within pad pockets 4, and a seam 19 at each pad also forms a junction with the inner and outer materials 7, 8, thereby comprising the overall contour of the thermal jumper 1. The entirety of the thermal jumper 1, including the inner and outer materials 7, 8 and the locations of the heating pads 20-68 correspond to the location of specific muscular groupings and/or joints of the human anatomy when the thermal jumper 1 is donned by a user. For example, pads 9 may be located on some of body anatomy areas, like: right & left top & bottom arm muscles like: triceps & biceps, forearm-extensors, forearm-flexors (strain & sprain) tendons, etc.

Beginning with FIG. 1, there is illustrated a frontal view of a stylized version of the thermal jumper 1, showing primarily the front pad heating elements 13. Starting with the upper portion of the thermal jumper 1, there is shown a right neck pad 64, a left neck pad 65, a right top shoulder pad 41, a left top shoulder pad 40, a right breast pad 63, a left breast pad 62, a right lung pad 61, a left lung pad 62, a right abdominal pad 67, and a left abdominal pad 68.

Continuing with FIG. 1, there is further shown a mid-body zipper 10, a right front shoulder pad 45, a left front shoulder pad 44, a left bicep pad 51, a right bicep pad 50, a right arm fold pad 49, a left arm fold pad 48, a right side pocket 5, a right outer thigh pad 33, a left outer thigh pad 32, a right inner thigh pad 31, a left inner thigh pad 30, a right kneecap pad 27, a left kneecap pad 26, a right calf pad 25, a left calf pad 24, a right ankle pad 23, a left ankle pad 22, a right foot instep pad 21, and a left foot instep pad 20.

Figure 2:
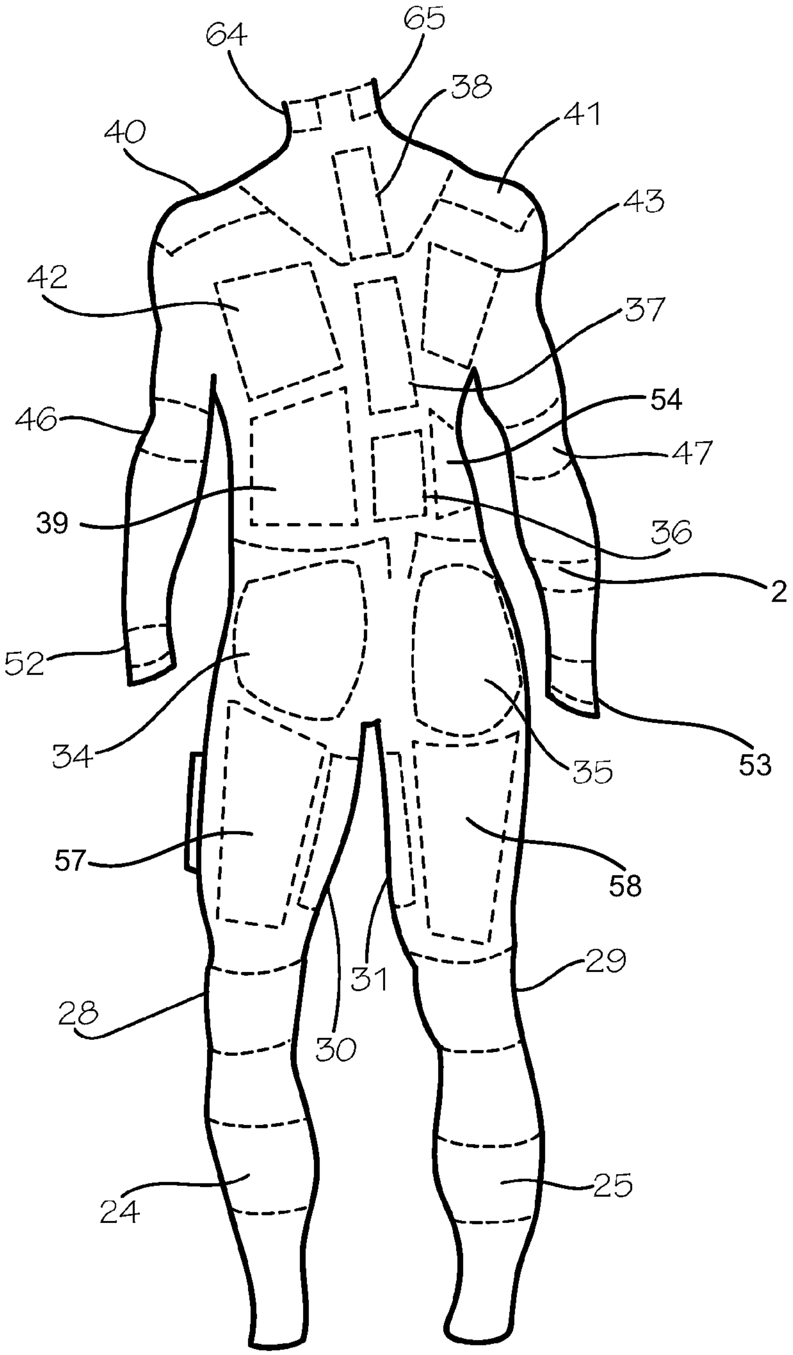

In referring to FIG. 2, there is shown the general arrangement of the rear pack systems 14. Starting with the upper portion of the thermal jumper 1, there is shown the right neck pad 64, left neck pad 65, right top shoulder pad 41, left top shoulder pad 40, a left shoulder blade pad, a right shoulder blade pad 43, a left elbow pad 46, a right elbow pad 47, a left wrist pad 52, a right wrist pad 53, an upper spine pad 38, a mid-spine pad 37, a lower spine pad 36, a left gluteous pad, a right gluteous pad 35, a left breast pad 62, a right lung pad 61, a left lung pad 62, a right abdominal pad 67, a left inner thigh pad 30, a right inner thigh pad 31, a left inner knee pad 28, a right inner knee pad 29, a lower left back 39, a lower right back 54, a left back thigh 57, a right back thigh 58, a left rear calf pad 24, and a right rear calf pad 25. Furthermore, both the right & left back of the thigh heating pads 57, 58 needs to be long enough to cover almost the entire back part of both leg thighs.

Integral to the thermal jumper 1 are sections of thin, web-like material located under each arm pit and the crotch area, thereby providing ventilation to these parts of the body.

Figure 3:
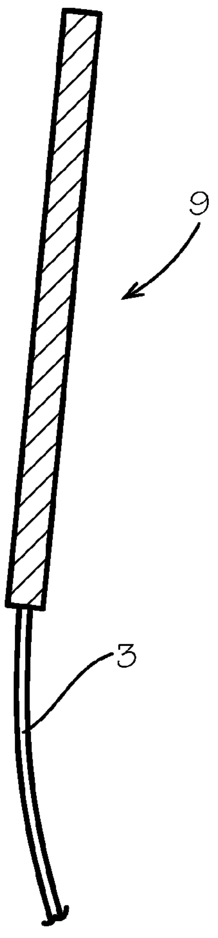

FIG. 3 illustrates a stylized, cross-sectional view of the typical pad 9 heating and vibrational component used in the thermal jumper 1, further showing the location of a length or plurality of lengths of wiring 3 which becomes heated by electrical current supplied to the individual pad 9. The wiring 3, in the preferred embodiment, is composed of insulated, thin carbon fiber that works from low voltage outputs of 12 to 24 volts. The wiring 3, is fabricated integral to each pad 9 and is further connected to a general distribution wire leading from a battery or battery packs contained within a side pocket 5 of the thermal jumper 1. The heat may thus be supplied to all pads 9 which internally contain one, or a plurality of the wires 3.

Direct current electricity is required in the preferred embodiment and may be provided by means of single-use batteries or one or more rechargeable battery packs contained in the side pocket 5. In other embodiments, carbon fiber embedded in the pads 9 may be the heat conducting mechanism.

Figure 7:
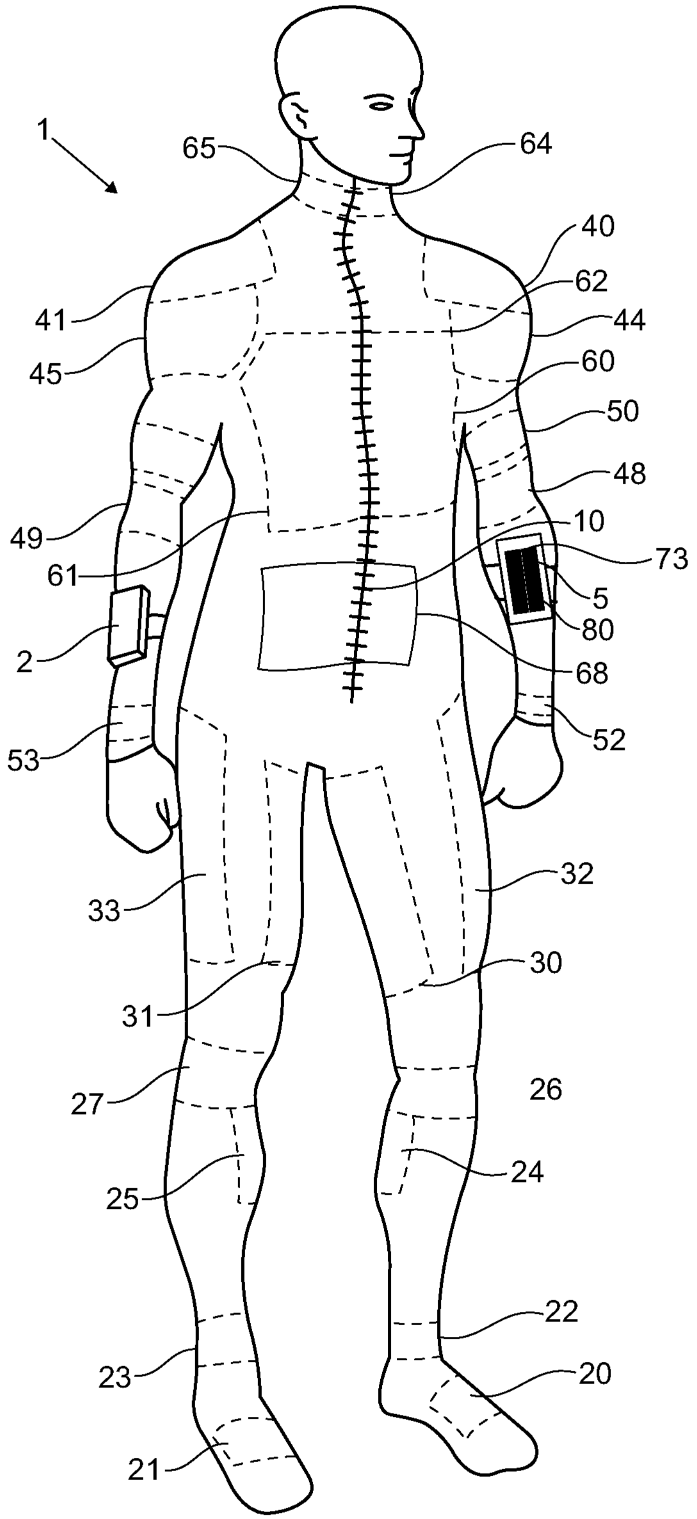
FIG. 7 illustrates a body suit that has side pocket containing solar cell.

In other embodiments, like illustrated in FIG. 7, direct current electricity is provided by at least one solar cell 80 contained in at least one side pocket 5, and the side pocket 5 is configured to have a hole 73 to let at least one photovoltaic panel 81 of the solar cell 80 expose outside the body suit. In this This will make the solar cell 80 can automatically generate electricity because the solar cell 80 is exposed to the sunlight when user wear the body suit and go out for exercise, and the solar cell 80 is equipped with a LED light and has an all-weather condition chargeable battery that can charge up to 20,000 mAh, and can be extremely quick for charging the pads or other devices, so it is very efficient for the user who wear the body suit 1. In addition, the edge portion of the photovoltaic panel 81 may coat with a reusable adhesive layer or set up a hook and loop fastener to be detachably fixed in the side pocket 5. The solar cell 80 is also connected with the pads and the controller 2, and the controller 2 can control which pad should be given power by the solar cell 80 to generate heat and/or vibration, in order to control the heating level and/or the vibration level of each pad according to the actual needs of user. For example, if the user wants to warm up or have massage on arms, user can simply operate the controller 2 to make only the pad(s) located at arms generate heat or vibrate to fulfill the needs.

The side pocket 5 which contains the solar cell 80 is located at the left forearm in some embodiments to have a better position for gathering sunlight, but it can still be located at other areas, such as chest, upper arm, etc., so its location is not limited.

Figure 8A:
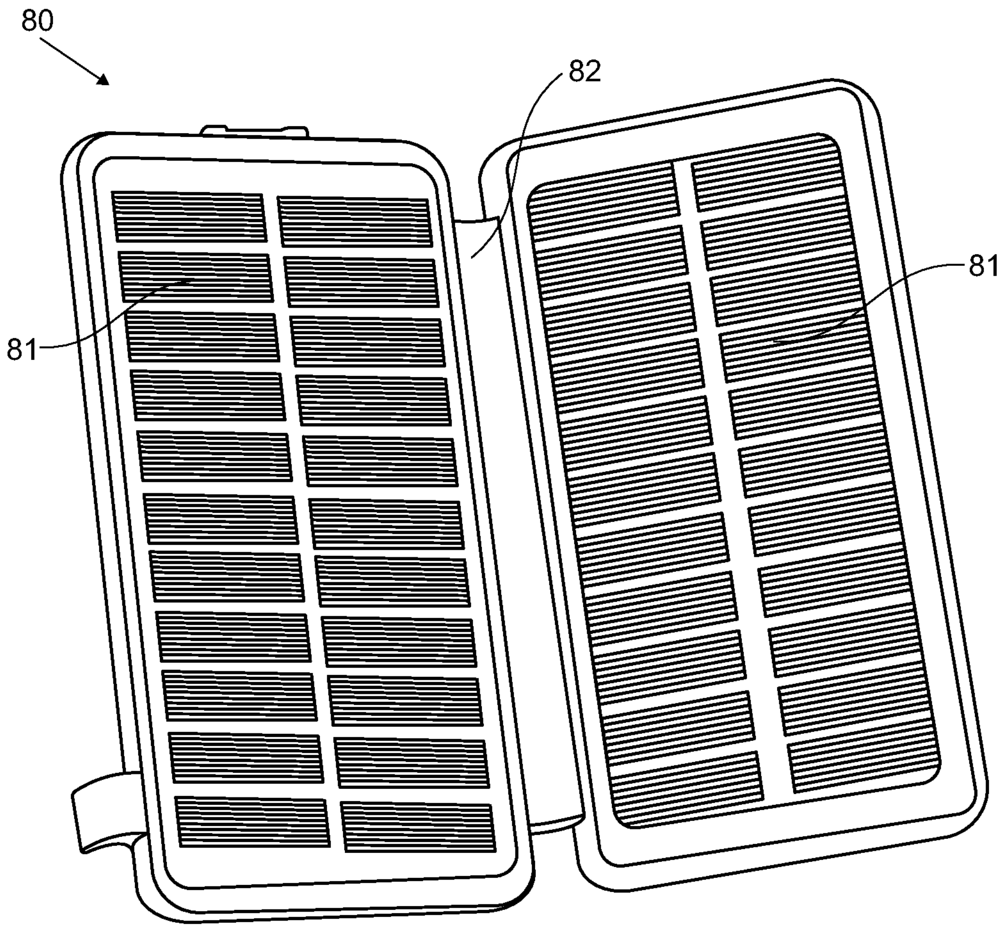
FIG. 8A illustrates one embodiment of the solar cell.
Figure 8B:
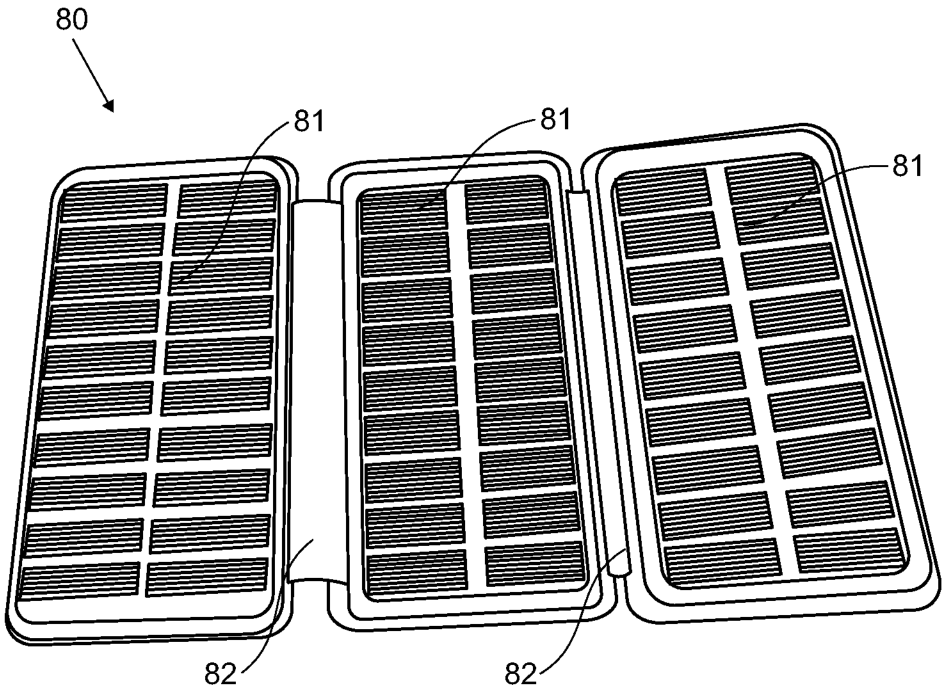
FIG. 8B illustrates another embodiment of the solar cell.

Furthermore, like illustrated in FIGS. 8A and 8B, the amount of the at least one photovoltaic panel 81 can be two, three or more, and when a plurality of the photovoltaic panel 81 is established, one or two of the photovoltaic panels 81 are configured to fold over rest of the photovoltaic panels 81 in the closed position when the photovoltaic panels 81 are connected to each other via a longitudinal connecting piece 82. This will let the user can fold over these photovoltaic panels 81 and make the solar cell 80 smaller to easily keep it and save the storage space.

In other embodiments, the body suit 1 is made of Lycra or Nylon, and every pad, which located at different places in the body suit 1 (especially at the joint locations), contain two different wirings. First wiring is for generating heat and the first wiring is covered with a protection layer, the protection layer can be thermal conductive polymer material, MgO, SiC, AlN, BN, or $Al_2O_3$, etc. This will protect the user from being hurt by the possible of electricity leak. Second wiring is for generating vibration and the second wiring is made of copper-nickel alloy or steel. In addition, there is a blocker set between the first wiring and the second wiring to separate these two wiring, this will make these two wiring don't have any possibilities to accidentally touch each other to avoid short circuit or other problem that will cause the pads to be not functioning properly or even broken.

In some embodiments, some of the pads are located at the areas where corresponding to the human's joint. Thus, after the user wearing the body suit 1, the user can activate the heating and/or vibrating function of the pads to improve user's blood circulation, and if the user has blood clot problem, the symptom will help to dissolve and reduce the size of blood clots since the user can control which and where the pads should be activated to make the user feel better. Furthermore, the body suit 1 can also have many other functions, such as: help with the cooling & thermal heating of swollen & sore joints & muscles pains; help fully control body temperature to further help with weight loss/control; provide skin therapy & moisture for dry irritated skin, etc., so the body suit 1 is very different compared to other inventions.

Figure 9A:
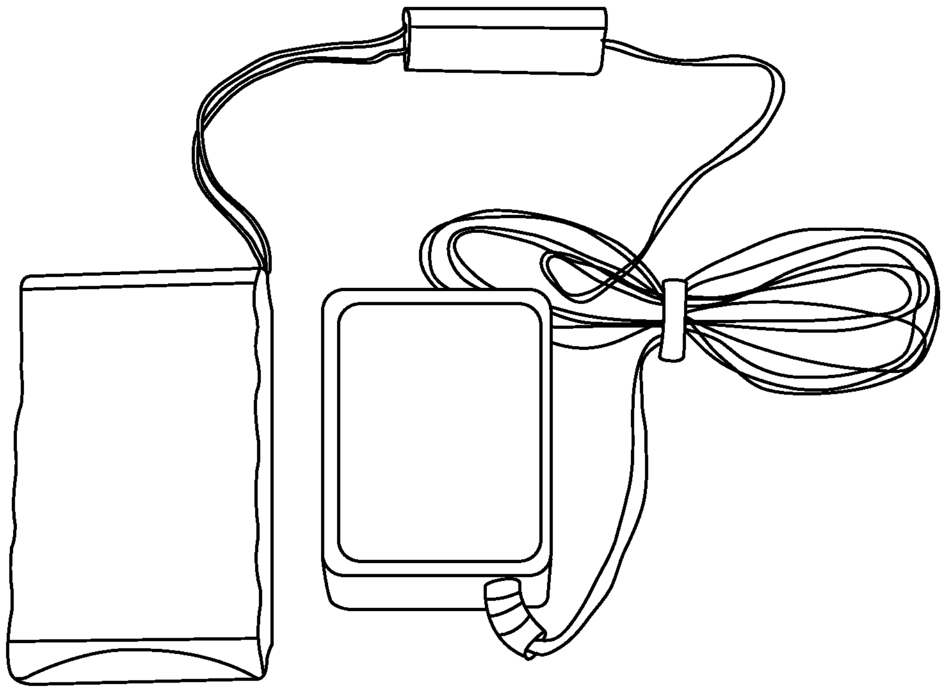
FIG. 9A illustrates one embodiment of the battery pack.
Figure 9B:
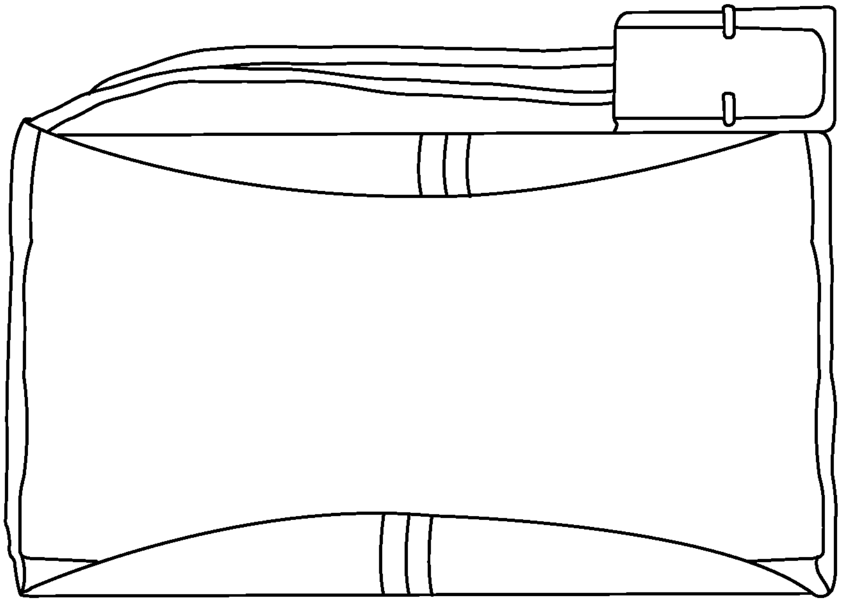
FIG. 9B illustrates another embodiment of the battery pack.

In the preferred embodiment, please also see the FIGS. 9A & 9B, the thermal jumper 1 will utilize rechargeable batteries or battery packs 90, which are available in a variety of sizes to accommodate the electrical current needs of the thermal jumper 1. Rechargeable battery sizes include AAA, AA, C, D, and 9.6 volt. Further, many brands of rechargeable batteries are sold as sets that include a charger 91. An appropriate battery charger 91 may be included as part of the components of the thermal jumper 1. Nickel-Zinc and Lithium-Ion batteries require specialized chargers. However, nickel-metal hydride and nickel-cadmium batteries can be used with universal chargers. In some embodiments, the thermal jumper 1 may be provided electrical current by means of an ac-dc adaptor.

In other embodiment, the rechargeable batteries or battery packs can co-exist with the solar cell 80, and they can disconnect & reconnect throughout the wired thermal jumper 1 that is connectively attached & located within all three of the small pockets (right hip, right & left arm). User can also use the controller 2 to decide whether he/she wants to use what kinds of the power source, and if one of the power source is dead, the user can still use another source to power the thermal jumper 1, this will help user have more flexibilities when using the thermal jumper 1.

Figure 4:
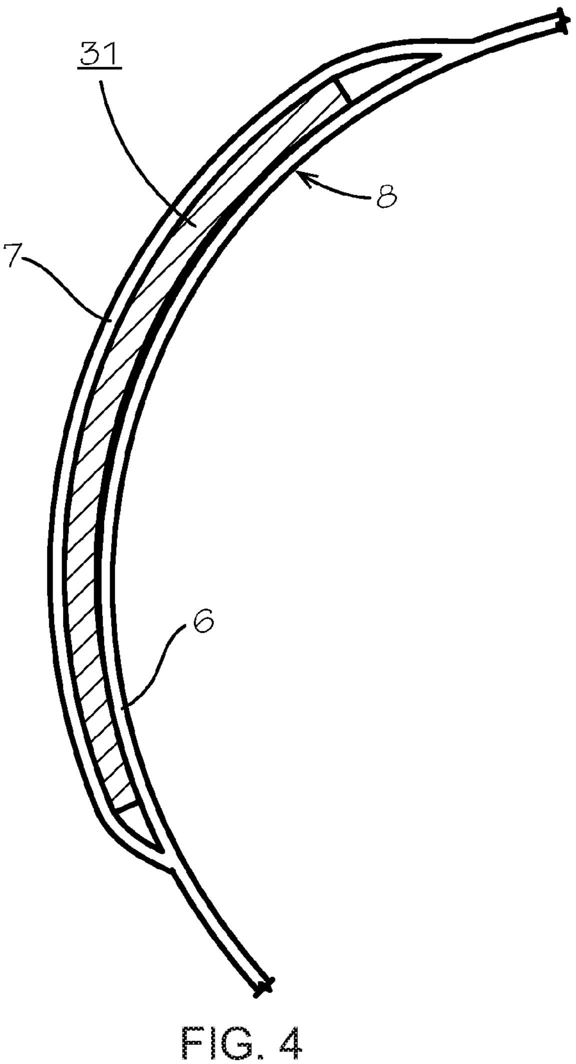
FIG. 4 depicts a cross-sectional view of the right inner thigh 31 pad 9.
Figure 5:
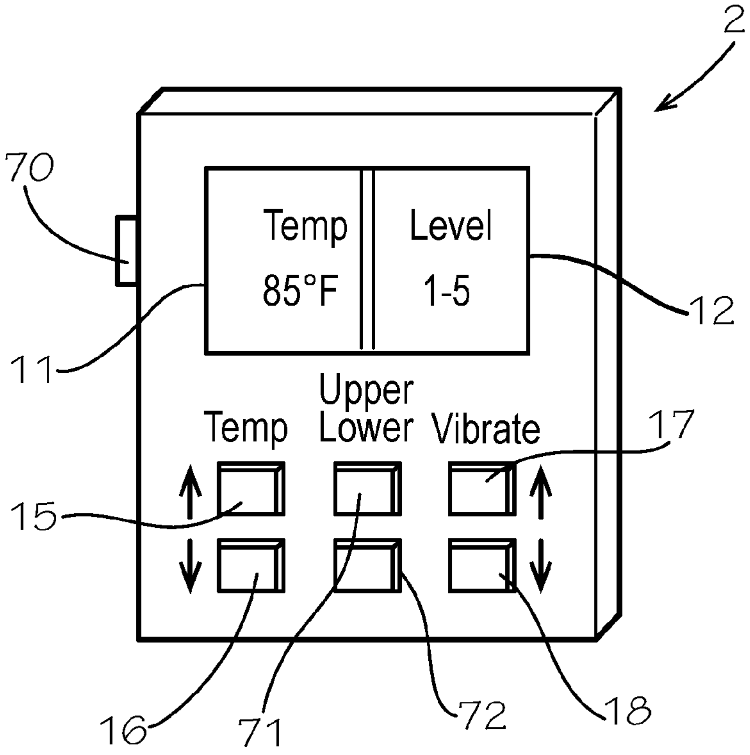
FIG. 5 illustrates the wrist-mounted controller 2 along with various control settings available.
Figure 6:
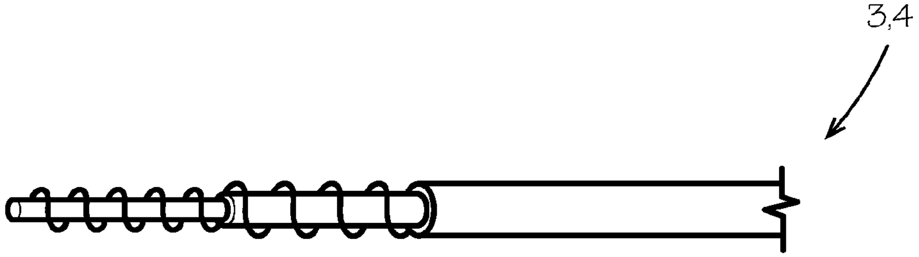
FIG. 6 depicts the typical construction of wiring 3 that may be utilized in the jumper 1.

FIG. 4 depicts a cross-sectional view of the right inner thigh pad 31, typical of the general jumper 1 pads 9, as it is pressed against the skin 6 of the inner thigh of a wearer. In FIG. 4, the pad 9 is illustrated fitting within a pad pocket 4, the pad pocket 4 having been formed by the inner material 7 and the outer material 8. A portion of stitching 19, connecting the inner material 7 and the outer material 8, is shown at each terminal end of the pocket 4.

The controller 2 may, in different embodiments, include an electronic user interface preferably comprising a set of controls, a processor, and a memory function to effectively operate the heating pads 9 according to the needs of the user. The aforementioned user interface may include a variety of stand-alone or shared devices that are capable of generating and transmitting a control signal upon receiving a user input. For example, exemplary user interface devices may include a remote controller employing RF, infra-red, acoustic, or cellular technology, as well known in the industry.

In alternate embodiments, the user interface may include a handheld computer, a PDA, a cell phone, a keyboard, a mouse, etc. that may be comprised of commercially available hardware and software operating systems, for example. The aforementioned user interfaces are intended to represent a broad category of exemplary user interfaces capable of functioning in accordance with the present invention. Of course, the user interfaces may include other components, peripherals and software applications provided they are compatible and capable of operating the numerous pads 9 contained within the thermal jumper 1.

For providing vibration movement and sensations to each pad 9, the means utilized may be an electrical current directed to multi-level piezo-electric chips or directed to mechanical vibrators imbedded within the pads 9. Electrically-driven mechanical vibrators, which vibrate at a frequency of 20-to-50 cycles per second, may be incorporated into each of the pads 9. Studies have shown that muscle tension caused by physical injury, emotional stress, or overwork, can be released by a combination of heat and vibration. Peter La Grasse, LMT; Symposium, Complementary and Alternative Medicine, Jun. 19, 2003.

While preferred embodiments of the present inventive concept have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

What is claimed is:

1. A body suit for a person comprising:

a plurality of pads attached to an internal surface of the body suit and corresponding with a specific part of the human anatomy, each of the pads comprising a heating element and a vibration element;

each pad comprises electrical wires connected to a controller, wherein the controller is configured to separately control heat and vibration for each of the pads individually and independently;

the controller comprises electrical wires connected to a dc power source; and the specific parts of the human anatomy, each of which has a corresponding pad comprise a neck, a shoulder, a portion of the back, an arm, a bicep, a wrist, a breast, a lung, an elbow, a portion of the abdomen, a gluteous, a portion of the spine, a thigh, a knee, a calf, an ankle, and a foot;

wherein the body suit is one-piece and form-fitting.

2. The body suit of claim 1, wherein the body suit comprises a plurality of pockets attached to the internal surface of the body suit and each of the plurality of pads are contained in one of the plurality of pockets.

3. The body suit of claim 1, wherein the dc power source comprises a battery or a photovoltaic cell.

4. The body suit of claim 3, wherein the battery or photovoltaic cell is included in an outer pocket of the body suit.

5. The body suit of claim 4, wherein the outer pocket includes a hole that allows the photovoltaic cell to be exposed to sunlight.

6. The body suit of claim 1, wherein the electrical wires are configured to be blocked from coming into contact with another wire.

7. The body suit of claim 1, wherein the neck comprises a right side of the neck and a left side of the neck.

8. The body suit of claim 1, wherein the shoulder comprises a left top shoulder, a right top shoulder, a left shoulder blade, a right shoulder blade, a left front shoulder, and a right front shoulder.

9. The body suit of claim 1, wherein the foot includes a left foot instep, a right foot instep, a left ankle, and a right ankle.

10. The bodysuit of claim 1, wherein the calf includes a left rear calf and a right rear calf.

11. The bodysuit of claim 1, wherein the knee includes a left kneecap and a right kneecap, a left inner knee, and a right inner knee.

12. The bodysuit of claim 1, wherein the thigh includes a left inner thigh, a right inner thigh, a left outer thigh, a right outer thigh, a left back thigh and a right back thigh.

13. The bodysuit of claim 1, wherein the gluteous includes a left gluteous and a right gluteous.

14. The bodysuit of claim 1, the portion of the spine includes a lower spine, a mid-spine, and an upper spine.

15. The bodysuit of claim 1, wherein the portion of the back includes a left lower back and a lower right back.

16. The bodysuit of claim 1, wherein the arm includes a left arm fold, a right arm fold, a left bicep, and a right bicep.

17. The bodysuit of claim 1, wherein the wrist includes a left wrist and a right wrist.

18. The bodysuit of claim 1, wherein the lung includes a left lung and a right lung.

19. The bodysuit of claim 1, wherein the breast includes a left breast and a right breast.

20. The bodysuit of claim 1, wherein the abdomen includes a right abdomen and a left abdomen.

21. The bodysuit of claim 1, wherein the ankle includes a left ankle and a right ankle.

22. The bodysuit of claim 1, wherein the bicep includes a left bicep and a right bicep.

23. The bodysuit of claim 1, wherein the suit comprises a polyether-polyurea copolymer or a polyamide copolymer.

* * * * *